United States Patent [19]

Hannig et al.

[11] Patent Number: 4,590,758
[45] Date of Patent: May 27, 1986

[54] CHAIN COUPLING LINK

[76] Inventors: Robert Hannig, Ludwig-Uhland-Str. 6, D-4354 Datteln; Jürgen Rast, Büscherstr. 65, D-4355 Waltrop, both of Fed. Rep. of Germany

[21] Appl. No.: 527,520
[22] PCT Filed: Jan. 20, 1983
[86] PCT No.: PCT/DE83/00008
  § 371 Date: Aug. 16, 1983
  § 102(e) Date: Aug. 16, 1983
[87] PCT Pub. No.: WO83/02653
  PCT Pub. Date: Aug. 4, 1983

[30] Foreign Application Priority Data

Jan. 22, 1982 [DE] Fed. Rep. of Germany ....... 3201840

[51] Int. Cl.[4] .............................................. F16G 13/06
[52] U.S. Cl. ..................................... 59/85; 59/35.1; 72/340
[58] Field of Search .............. 59/85, 86, 87, 88, 84, 59/78, 93, 12, 35.1, 30, 10; 72/356, 340, 341

[56] References Cited

U.S. PATENT DOCUMENTS

| 859,082 | 7/1902 | Kenter | 59/85 |
| 2,353,940 | 7/1944 | Staats | 59/85 |
| 3,442,110 | 5/1969 | Walton et al. | 72/356 |

FOREIGN PATENT DOCUMENTS

| 1212795 | 3/1966 | Fed. Rep. of Germany . | |
| 1901367 | 8/1970 | Fed. Rep. of Germany . | |
| 2108844 | 5/1972 | Fed. Rep. of Germany . | |
| 2200381 | 5/1973 | Fed. Rep. of Germany | 59/85 |
| 7406430 | 6/1974 | Fed. Rep. of Germany . | |
| 2813748 | 3/1978 | Fed. Rep. of Germany . | |
| 2805917 | 7/1979 | Fed. Rep. of Germany . | |
| 6405203 | 11/1964 | Netherlands | 59/85 |
| 1043478 | 9/1966 | United Kingdom . | |

Primary Examiner—Daniel C. Crane
Assistant Examiner—David B. Jones
Attorney, Agent, or Firm—Remy J. VanOphem

[57] ABSTRACT

A coupling link for chains made of generally round stock has parallel legs and curved end pieces joining the two legs together. A stud inserted between the parallel legs and a locking rod inserted into a hole in the stud and the ring member locks the assembly together. The ring member is made up of two halves that are complementary in outline with each having a curved end piece which forms a short and a long leg. The short leg has a pin thereon and the long leg has a hollow therein for receiving the pin of the short leg of the other link half. The stud and the legs of the coupling member having projecting locking faces for locking the stud in position. The stud is rounded in form at its ends like the chain stock. The stud and the pin are symmetrically placed in relation to the transverse plane of the coupling link. The legs have end faces in the transverse plane of the coupling links inner bearing faces which contact the end faces of the stud. The inner bearing faces and end faces of the pins have outer edges with forged chamfers.

4 Claims, 16 Drawing Figures

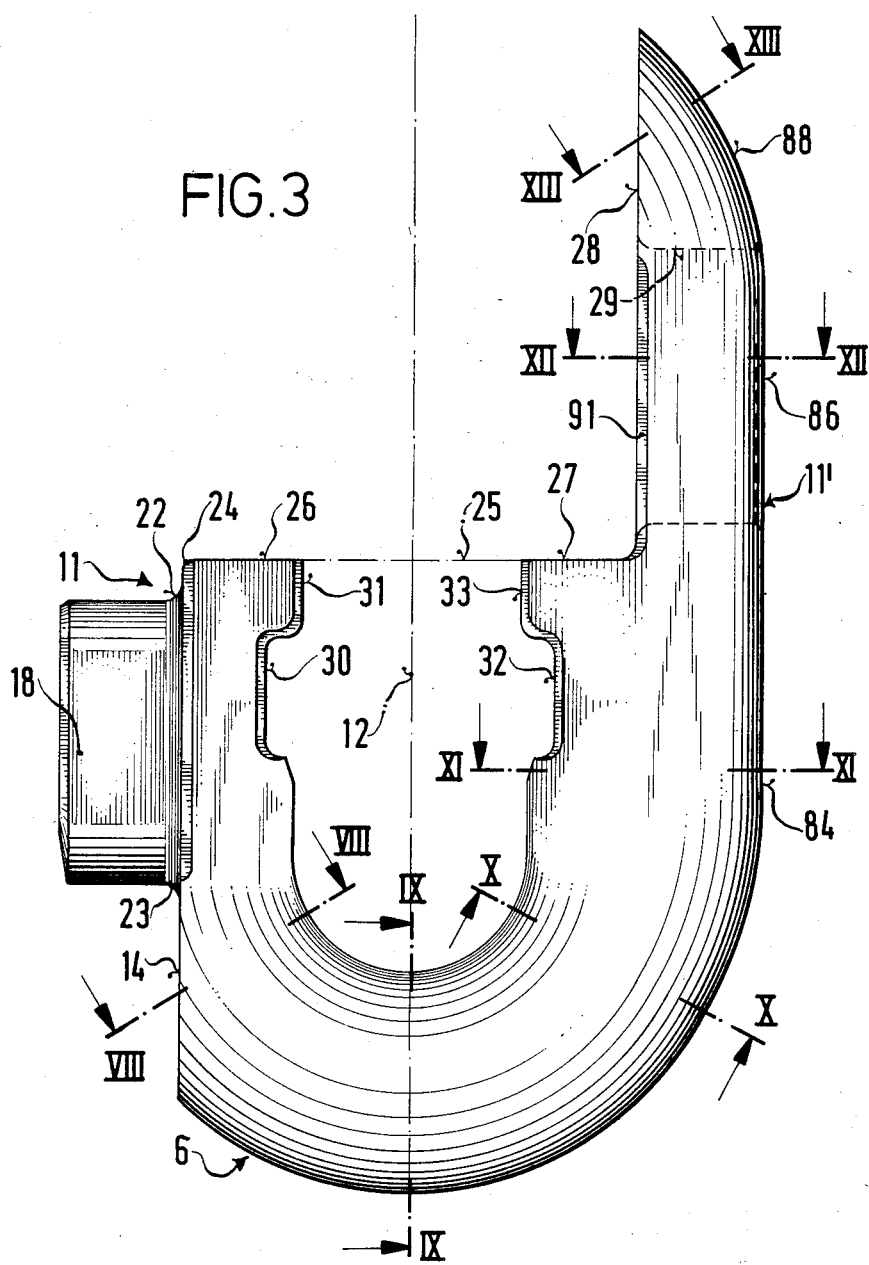

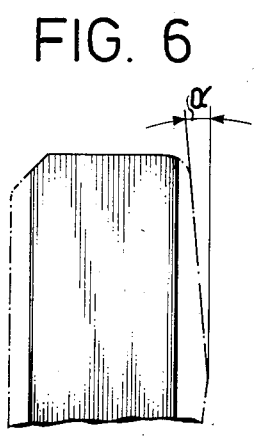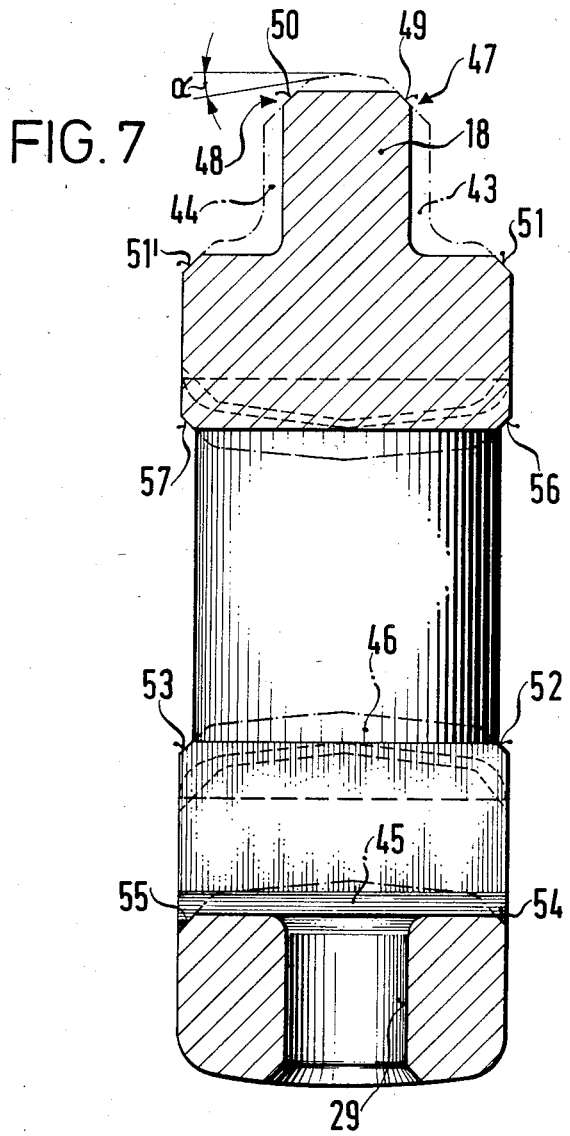

CHAIN COUPLING LINK

BACKGROUND OF THE INVENTION

1. Field of the Invention

The present invention concerns a coupling link for welded chain and more specifically concerns a coupling link for welded link chain made up of two parallel spaced legs, two curved end parts joining the legs together to give the loop structure and a stud placed between the legs within the loop. The coupling link is made in two link halves that may be separated and then fixed together using a locking rod running through the two legs and the stud. The two link halves are such that each part has a short leg with a pin, a curved end part, and a long leg having a hole therein for receiving the pin of the shorter leg of the other half. The link has inner faces thereon for fixing the stud in position therebetween.

2. Description of the Prior Art

Welded link chains are used as driving connections between pulleys round which they are guided, wherein the outer faces of the pulleys must have regular pockets therein to take up the links of the chain. The links which are flat against the outer face of the pulley are joined together by upright links whose plane is in, or parallel to, the plane of the pulley. The coupling link of the present invention is constructed so that it may be run in either of the two possible positions in relation to the outer face of the pulley, that is, resting flat in a pocket in the pulley or in the plane of the pulley. In this respect it is different from prior art emergency chain repair links while, however, being similar in that it may be taken off or put on at any time desired. The coupling link of the present invention is, furthermore, to be distinguished from other coupling links that are designed for running in only one plane on a pulley, this normally being a plane parallel to the plane of the pulley.

One example of the prior art, of which the present invention is a further development, is the coupling link disclosed in the British patent specification No. 1,043,478, wherein the cross-section of the pins were made as large as possible in view of the static shearing forces. For this reason the cross-section of the pins were made so large that they extended as far as the middle transverse plane of the coupling link because in the outer direction the pins may only go as far as the start of the rounded end parts of the link. In this construction, the various parallel load bearing faces of the link were out of line with each other at the end faces of the stud. By accommodating the load bearing function, the sides, facing the rounded ends of the link, had a partly straight and a partly curved saddle line, which can be seen in the plane of this flat coupling link.

Normally the stud and the two halves of such a coupling link are drop forged. The two faces which are separated by a step on the finished drop forging then have to be machined in a number of stages. To this end, the workpiece is forged to be oversized so that the excess material can be machined away by broaching or milling.

However, such a known coupling link has shortcomings in use and there are some problems in connection with machining the link surfaces. If the flat coupling link is not positioned on the driving pulley so as to be parallel to the plane of the pulley but is flat against the outer face of the pulley, the rounded parts of the chain links next to the coupling link are turned so far that the studs thereof are violently forced against the faces of the stud of the coupling link. The saddle line of the stud of the coupling link experiences a load or force acting on the stud in a direction transverse to the plane of the coupling link. This transverse load imposes a shearing load on the locking rod. For this reason the coupling link may be damaged or even forced open resulting in breakage of the chain.

The machining, i.e. broaching, of the load bearing faces in the manufacture of such a flat chain coupling link has the effect of cutting the fiber or grain of the metal that has been produced during the forging process so that the strength of such a flat chain coupling link is greatly decreased. Furthermore, after broaching, there will be sharp edges or burrs near the pins on the legs and on the end faces of the pins. When the chain is then used in a position where the coupling link is rested flat on the outer face of the pulley (and not placed upright thereon) these sharp edges will be stressed and cold-worked in different ways. This leads to the formation of hairline cracks that in turn could cause fatigue failure in such a coupling link, in other words, the fatigue life of the coupling link is significantly reduced due to the stress formations as a result of these changes in load direction that take place before fatigue failure.

These problems make the machining of such forged parts of the known form of flat chain coupling link relatively complex, because the different faces on the two legs of the link and the two end faces of the stud are not in an upright plane but out of line in parallel planes so that the broaching of the legs of the coupling link has to be accomplished with a needle-like broach. Round milling or broaching cutters cannot be used because of the small amount of clearance between the faces inside the coupling link. Furthermore, the machining of the studs, and more particularly of a number of studs put together in the form of a stack, is very hard to undertake because the projecting faces are out of line with each other in the sideways direction. For these reasons the edges of the load bearing faces may not be machined fully to obtain a higher fatigue resistance.

In the case of the prior art coupling links discussed above the experience has been that the force transmission capacity is not high enough, as demonstrated by the fact that the load bearing faces exhibit signs of deformation after the flat coupling link has been in use for some time. Furthermore, fatigue fractures are frequent. These fractures start at the outer end faces of the pins and run through as far as the rounded parts of the coupling link. To solve this problem, it has been suggested to reinforce the flat coupling link in this area, such as making the links of steel of the same composition as used for the normal welded links of the chain. The outcome of this suggestion was a flat chain coupling link in which the middle stud was rounded off to conform with the shape of the links joined by the coupling link and the stud and the pins were symmetrical about the middle plane of the coupling link formed by the two halves and the end faces of the short leg sections lined up with each other. The rounded parts of the coupling link then had to be reinforced so that the coupling link may only be run in an upright position on the pulley, that is, with its plane parallel to the plane of the pulley. An example of this prior art construction is disclosed in the German Offenlegungsschrift specification No. 2,813,748. A number of attempts have been made to solve these problems, for example, by turning the chain when using such a flat coupling link, or in other cases by using a number of such flat coupling links with round chain links. In general, it has turned out that these shortcomings of the known flat chain coupling piece are so serious that these couplings are not used at all in general applications and especially in mining applications.

Furthermore, the machining of the load bearing faces of the flat chain coupling, that is, those faces abutting against the stud, is certainly not made any simpler even with the symmetrical form, because the reinforced rounded end pieces result in an inner space much smaller in size which makes machining this space very difficult.

The coupling link of the present invention is made in two like halves so that it may be taken apart and put together again. For joining two lengths of chain each of the halves is threaded through the end links of the pieces of chain and then the halves are moved together in their own plane such that the pin of one half is slipped into the hole in the other half and vice versa. The stud is then placed into position between the two link halves. Generally, the prior art locking rod used for locking the two halves together has frequently been designed to take up shearing and tension forces. In the present invention, the locking rod used to lock the two halves together, after being placed in position, does not experience any shearing forces.

In the present invention the necessary tensile strength is provided by the legs and the stud as the bearing faces of these parts are placed and so locked together that the tension or pulling forces at the rounded end parts are taken up thereby. It is necessary for the link to be constructed with such a geometry that, on the one hand, the chain will be fully resistant to the high tension or pulling forces and changes in the loading forces as is necessary in the case of heavy duty mining equipment chain applications while, on the other hand, the chain coupling link must run smoothly over the drive pulleys.

SUMMARY OF THE INVENTION

It is, therefore, a primary object of the present invention to construct a coupling link that may be run on a pulley flatwise or upright, that is, with the plane of the link parallel to the plane of the pulley.

A still further object of the present invention is to construct a coupling link with a form or shape that is optimum not only from the production engineering point of view but also from the point of actual use in plants using the chain links.

A further object of the present invention is to make coupling links of greater strength.

A still further object of the present invention is to provide coupling links which provide these useful advantages without any change in the way of assembling the link.

For effecting these and other objects that will become clear on reading the complete disclosure, a chain coupling link of the present invention is disclosed having a stud, which is rounded off to conform with the legs of the coupling link. The pins are symmetrical in relation to the middle transverse plane, along which the end faces of the leg parts are lined up. The bearing faces, at least in the area of the pins, have outer edges with forged chamfers along the edges mating with the stud and at the end faces of the pins.

It is a feature of the invention that the pins are made very much narrower than in all known prior art designs without a need to put on more material at the rounded parts of the coupling link in order to compensate for the narrow pins. This results in a reduced cross-section or thinning down of the material at the pins and the stud. Because there are chamfers there is now no chance of the edges being bent and deformed resulting in the formation of hairline cracks or other forms of weakness which might be the start of fatigue fracture. Because the chamfers are produced at the time of forging, the static strength of the coupling link is so greatly increased that the loss of strength due to the smaller size pins is insignificant.

By narrowing the cross-section of the links and reducing the size of the pins, machining operations become simpler, especially with respect to the load bearing inner faces of the ring member, because those faces which are in a common plane may be far more accessible and easily machined since there is enough space in the round link to operate the machining tools. In addition, having the forged chamfers also reduces the amount of material that has to be broached away. All in all, no more material has to be used in the new flat chain coupling link than in the prior art. In operation, there is the useful effect that the new flat chain coupling link may not only be run on the pulley in either of its two planes, as desired, but also the stud, when placed flat against the pulley, will not be loaded by the adjacent links which are placed at an angle in a direction normal to the plane of the coupling. A further useful effect produced by the new coupling link of the present invention is that the chamfers on the faces of the link half may be used for guiding a cold chisel used for separating the link pieces after the coupling link has been in use for a long time.

Further details of the present invention will become clear from the following description of one working example thereof as based on the figures herein.

BRIEF DESCRIPTION OF THE DRAWINGS

FIG. 3 is a view similar to FIG. 1 illustrating only one of the two halves of the ring link member;

FIG. 6 is a partial view of a single part or detail as viewed in the direction of the arrow VI of FIG. 5;

FIG. 7 is an offset sectional view taken along line VII—VII of FIG. 5;

DETAILED DESCRIPTION OF THE PREFERRED EMBODIMENT

Figure 1:
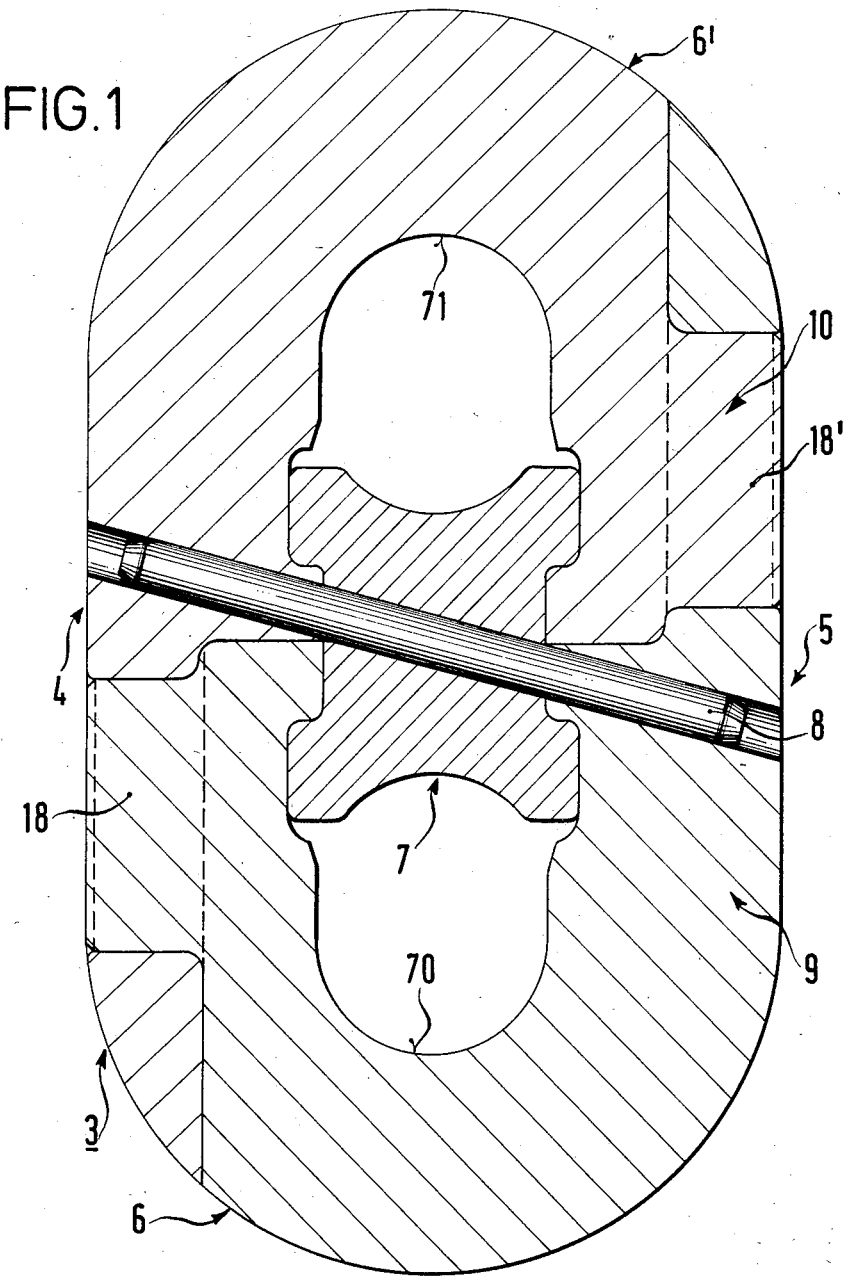
FIG. 1 is a longitudinal partial sectional view of a flat chain coupling according to the present invention in the assembled condition.
Figure 2:
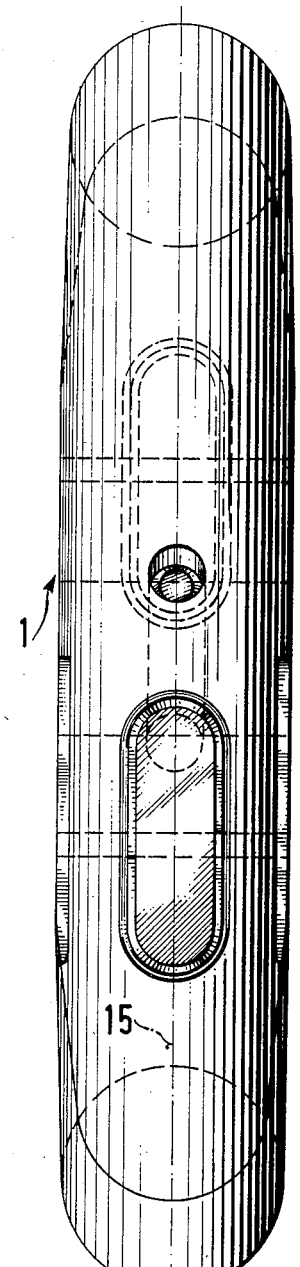
FIG. 2 is a side view of the structure shown in FIG. 1.

The flat chain coupling link as shown in FIGS. 1 and 2, generally numbered 1, has a ring link or loop member 3. The ring link member 3 is made up of parallel legs 4 and 5, rounded end pieces 6 and 6' adjacent thereto, and a stud 7 located between the parallel legs. The ring link member 3 and the stud are kept in position in relation to each other by a locking rod 8 which serves the function of keeping the parts together while not being directly acted upon by any loading forces. The ring link member 3 is made up of two complementary halves 9 and 10.

The two complementary halves 9 and 10 are oppositely cross-hatched in FIG. 1 to make it clear that they are separate pieces nested together. Because the two halves are the same, the description which follows concerns only one of the two complementary halves.

Figure 4:
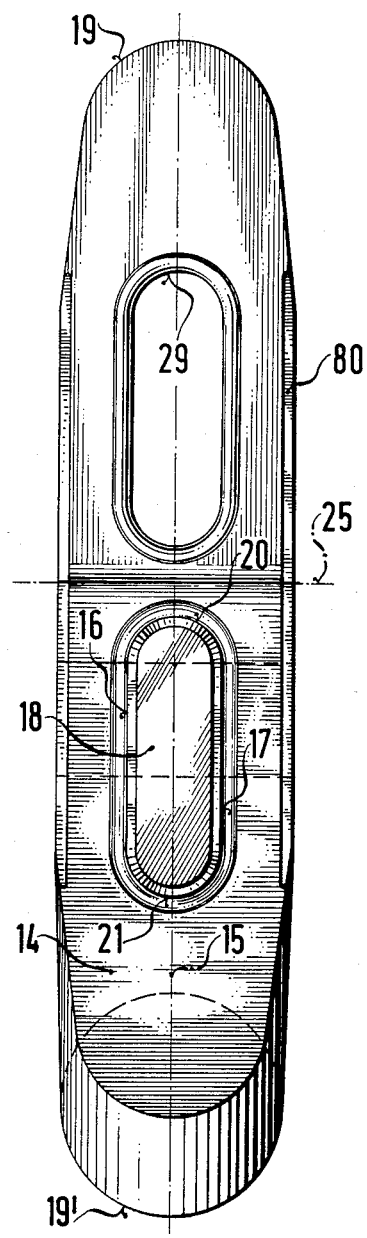
FIG. 4 is a side view of the structure illustrated in FIG. 3.
Figure 5:
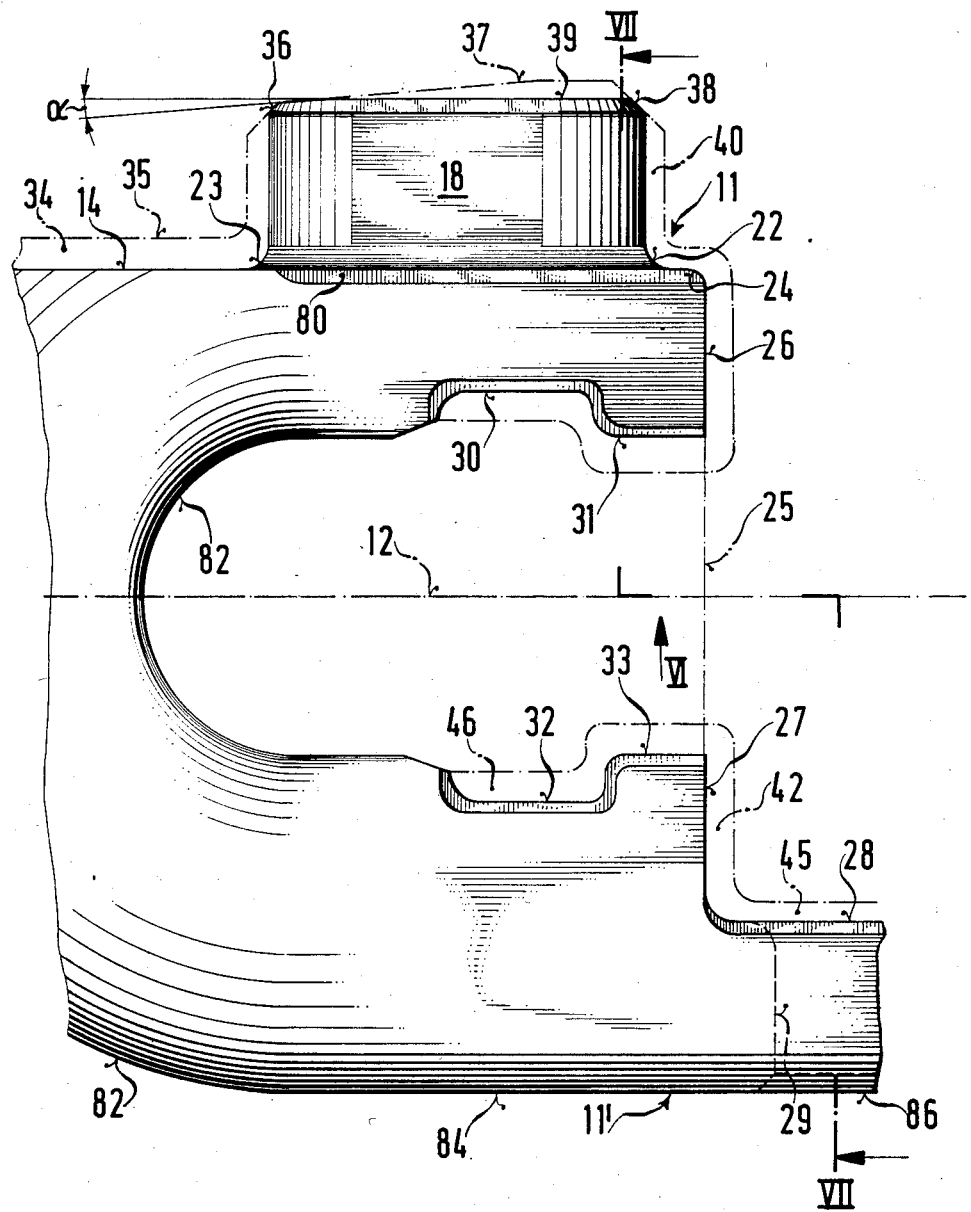
FIG. 5 is an exploded view of FIG. 3 of the single forged part of the structure with parts cutaway.
Figure 8:
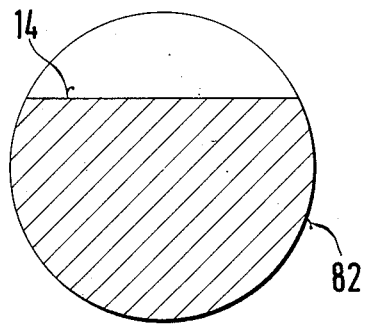
FIG. 8 is a sectional view taken along line VIII—VIII of FIG. 3.

As may be seen with reference to FIGS. 3 and 5, each of the halves has a rounded end piece 6 and a long and a short leg, 11' and 11 respectively. The short leg 11 has an outer face 14 with a flat surface portion in a plane parallel to a longitudinal middle or median plane 12. A pin 18 extends outwards normal to the plane of the flat portion of the outer face 14. The pin has two flat faces 16 and 17, shown in FIG. 4, running parallel to a side plane 15 of the coupling, and the two flat faces are connected by curved end faces 20 and 21, which generally follow the contoured round end part faces 19 and 19'. Furthermore, the root of the pin 18 is joined to the outer face 14 by radius portions 22 and 23. The outer face 14 has a radius 24 for forming a connected or chamfered edge joint with an end face 26 of the short leg 11 at the middle transverse plane 25 of the chain link. An end face 27, that is on the other side of the link on the longer leg 11', is in line with the end face 26. The end face 27 joins up with an inwardly turned face portion 28, which has a flat surface portion, of the longer leg 11' which is parallel to the middle or median plane of the coupling link. This inwardly turned face portion 28 is cut across a hollow 29, into which the pin 18' (as best shown in FIG. 1) of the other coupling half 10 is to be fitted at assembly.

On the inner side of the short leg 11 there are two inwardly directed faces 30 and 31 facing the median plane of the link half 9. The faces are parallel to the middle plane 12. Opposite to the faces 30 and 31 there are two additional inwardly directed faces 32 and 33, which also face the middle or median plane 12 and which are on the long leg 11'. FIG. 3 shows the completely machined workpiece while FIGS. 5 to 7 are views showing the as-forged material.

As may be seen from FIG. 5, the outer face 14 is forged with an oversize condition or machining allowance 34, whose outer face 35 is parallel to the machined outer face 14. The outer face 35 joins up with the pin 18 and a chamfered portion 36 forms the connection with the outer forged end face 37 of the pin 18. The outer forged end face 37 comes to an end at a chamfered portion 38. The outer forged end face 37 is tapered in a direction towards the rounded end piece 6 at an angle $\alpha$ to the later machined end face 39 of the pin 18. The chamfered portion 38 comes to an end at a forged face portion 40 extending over the eventual machined faces 22, 26, 31, and 30. The inwardly directed faces 32 and 33, the end face 27, as well as the inwardly turned face portion 28, have a forged oversize material condition 42 that is later machined away.

As is more clearly seen from FIG. 7, the forging for its part has oversize conditions along the pin 18 at positions 43 and 44 on the outer side of the short leg 11 and is furthermore made oversize along the inwardly turned face portion 28 at 45 and the inwardly directed face 33 at 46 on the long leg 11'. In this respect the chamfers 47 and 48 are forged at an angle coextensive with the sloping faces of the long edges 49 and 50 of the end face of the pin 18. Likewise, the chamfers 51 and 51' are forged at an angle coextensive with the slope of the long edges of the outer face 14, the chamfers 52 and 53 are forged at an angle coextensive with the slope of the long edges of the outer face 35 and the inwardly directed face 33, and the chamfers 54 and 55 are forged at an angle coextensive with the slope of the long edges of the inwardly turned face portion 28 of the longer leg 11'.

From the above description it will be seen that all the machining necessary on the forging as shown in FIGS. 5 through 7 will be broaching or milling away of the portions that have been outlined in phantom lines in FIGS. 5 through 7 as oversize so that the sloped faces of the different chamfers will be maintained. The angle $\alpha$ for forging purposes is made the same in each location and is given a value of five degrees so that each half 9 and 10 may be forged in a horizontal position in one die. The alignment of the grain of the metal produced during the forging process is maintained since the different sloping faces will be kept on the completely machined chamfered edges.

Further details will now be given of the assembly of the coupling link.

Figure 14:
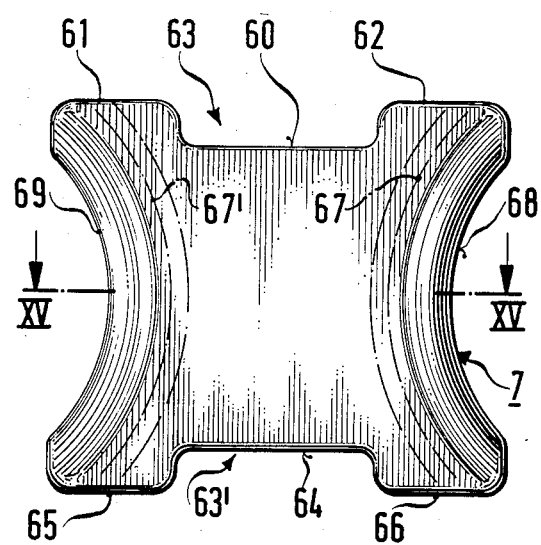
FIG. 14 is a plan view of the stud.
Figure 16:
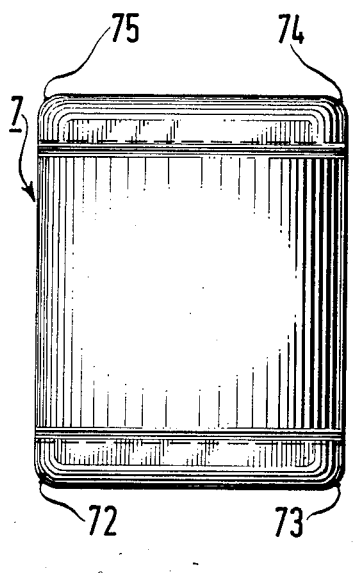
FIG. 16 is a side view of the stud as shown in FIG. 14.
Figure 15:
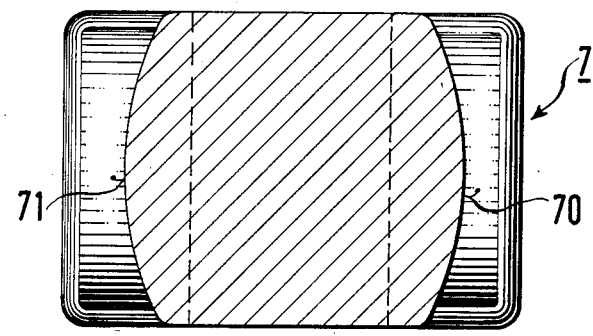
FIG. 15 is a cross-sectional view taken along line XV—XV of FIG. 14.

The pins 18 are placed so as to be symmetrical about the middle transverse plane 25, as shown in FIGS. 3 and 5, whereas the end faces 26 and 27 are aligned with the transverse plane 25. The stud 7, shown in detail in FIGS. 14 through 16, is assembled to the halves 9 and 10 so as to be symmetrical about the transverse plane 25. The stud 7 has two recessed faces 60 and 64 that are placed against the two inwardly directed faces 31 and 33. Furthermore, the stud 7 has two projecting faces 61 and 62 that are nested against the inwardly directed faces 30 and 32 of the two halves. The recessed and projecting faces 60, 61, and 62 found on the end face 63 are substantially the same as the recessed and projecting faces 64, 65, and 66 on the end face 63' of the stud 7.

The grain of the forged metal in the stud is marked with phantom curved lines 67 and 67'. The curvature of the grain runs in the same direction as the curved form of the saddle lines 68 and 69, which in turn match the inner curved portions 70 and 71 of the curved end pieces 6 and 6' as shown in FIG. 1.

As can be seen from FIG. 15, the inner curved portions 70 and 71 of the stud 7 are similarly curved so that when the coupling link's inner curved portion has been hooked to the links of the chain, it will still be possible for the links to be moved in all directions. Unlike the chain link halves the edges 72, 73, 74, and 75 along the end faces 63 and 63' of the stud 7 are rounded off and are not machined.

Generally, the machined surfaces of the forgings, as illustrated in FIGS. 5 through 7, is accomplished by broaching. The forged sloping faces designated as 80 in FIG. 5 are not machined when the chamfers 51 and 51' are machined but are kept as forged. When the coupling link has been put together the forged sloping faces 80 are used for guiding the point of a cold chisel which may be used for opening up the link when the flat coupling has been in use for some time.

Figure 9:
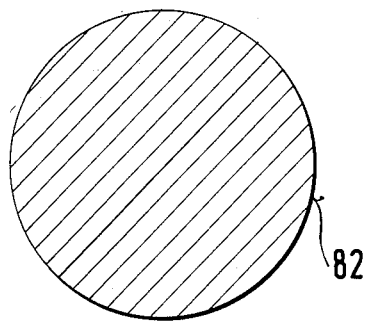
FIG. 9 is a sectional view taken along line IX—IX of FIG. 3.
Figure 10:
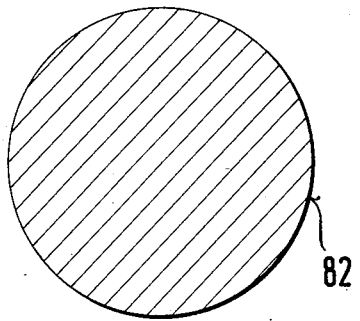
FIG. 10 is a sectional view taken along line X—X of FIG. 3.
Figure 11:
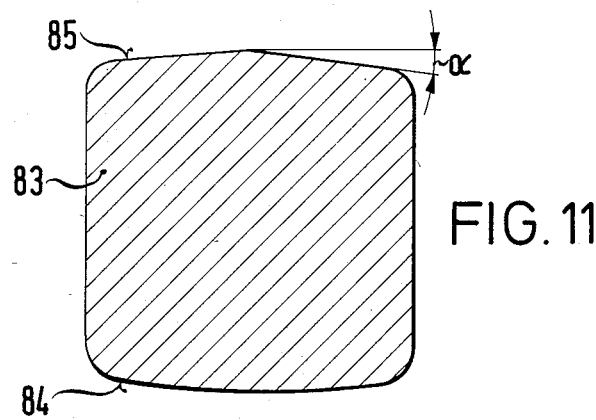
FIG. 11 is a sectional view taken along line XI—XI of FIG. 3.

As may be seen from the sections of FIGS. 8 through 11, with the exception of the machining of the outer face 14 in the section VIII—VIII taken through the short leg 11, the coupling link is not machined in the rounded end piece 6 of the link half 9. This results in a round outline 82 which is the same as that of the round stock from which a chain is made. The round outline 82 is also kept in the other sections of the rounded end pieces 6 as seen in FIGS. 9 and 10. It will be clear from FIG. 11 that the rounded parts in the short leg 11 are joined with and merged into the polygonal cross-section which has a rounded outer face 84 and a roof-like inner outline 85, whose slope is at an angle α of five degrees required for removing the forging out of the forging die.

Figure 12:
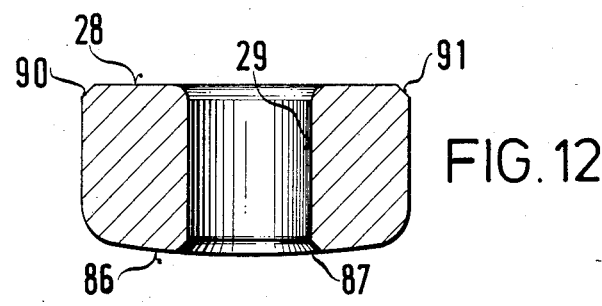
FIG. 12 is a sectional view taken along line XII—XII of FIG. 3.
Figure 13:
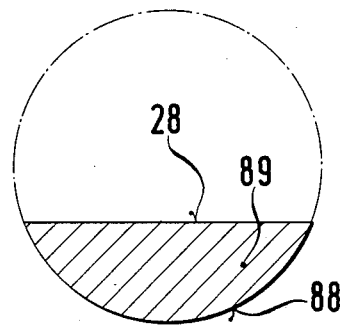
FIG. 13 is a sectional view taken along line XIII—XIII of FIG. 3.

The section of FIG. 12 taken through the pin hollow 29 shows the form of the inwardly turned face portion 28 of the longer leg and further shows that the outer face 86, representative thereof, is generally the same in form as the rounded outer face outline 84. The chamfer 87 on the outer side is not formed by forging but by some other machining operation as, for example, counterboring, It will be seen from FIG. 13 that the rounder outer faces 84 and 86 continue on further to the end of the longer leg where the cross-section 89 is produced by the inwardly turned face portion 28 which is parallel to the longitudinal middle plane 12 and because of the rounded part 88 (see FIG. 3) starting at a point to the back of the hollow 29.

The two chamfers 90 and 91, as shown in FIG. 12, are used with the chamfers 51 and 51' in forming a wedge-like pocket to take up the edge of a cold chisel or the like. The chamfers 90 and 91 in the present working example are sloped at 45 degrees similar to the chamfers 47, 48, 51, 51', 52, 53, 54, and 55.

In assembly of the flat chain coupling link two lengths of chain are joined by hooking each of the halves 9 and 10 of the ring link member 3 into one of the outer links at the ends of the pieces of chain so that the rounded end pieces 6 and 6' of the halves 9 and 10 take up positions therein. By moving the two halves 9 and 10 in the plane of the flat chain coupling link the pins 18 are inserted into their respective hollows 29. The stud 7 may then be inserted into place in a direction normal to the plane of the flat chain coupling link. As is shown in FIG. 1, when all the parts are in their desired positions, the apertures therein will be aligned to define a bore for the locking rod 8 so that the locking rod is then slipped into position to complete the assembly.

Having described the invention, what is claimed is:

1. A forged chain coupling link device comprising:
   two half link members adapted to engage and interlock into each other such that said two half link members form a coupling link having a longitudinal median plane and a middle transverse plane, each one of said two half link members comprising:
   a short leg having a machined outer face having a flat surface portion lying in a plane substantially parallel to said longitudinal median plane, said plane of said flat surface portion of said machined outer face and said longitudinal median plane being spaced apart a first predetermined distance; a machined end face lying in a plane coextensive with said middle transverse plane; a first machined inwardly directed face means located between said outer face and said longitudinal median plane; and a pin member having a machined end face extending from said outer face of said short leg in a direction away from said longitudinal median plane, said pin member having a median plane spaced a third predetermined distance from said middle transverse plane;
   a long leg having a machined inwardly turned face having a flat surface portion lying in a plane substantially parallel to said longitudinal median plane and diametrically opposite of said plane of said flat surface portion of said machined outer face of said short leg, said plane of said flat surface portion of said machined inwardly turned face and said longitudinal median plane being spaced apart a second predetermined distance, said second predetermined distance being equal to said first predetermined distance; a machined end face lying in a plane coextensive with said middle transverse plane; a second machined inwardly directed face means located between said inwardly turned face and said longitudinal median plane; and a hollow portion having an axis parallel to said middle transverse plane, said axis further being spaced a fourth predetermined distance from said middle transverse plane, said fourth predetermined distance being equal to said third predetermined distance;
   a rounded end piece having a first end portion integral with said short leg, a second opposite end portion integral with said long leg and a cylindrical central section between said first end portion and said second opposite end portion whereby said short leg, said long leg and said rounded end piece form one of said two half link members;
   hardened forged chamfer means located adjacent said machined end face of said pin member, said machined inwardly turned face of said long leg, said machined outer face of said short leg, and said first and second machined inwardly directed face means whereby said hardened forged chamfer means are preserved in an as-forged condition to avoid disturbing the grain structure of the metal after all machining operations are completed; and
   means for interlocking said two half link members to each other such as to form a chain coupling link.

2. The forged chain coupling link as claimed in claim 1 wherein said means for interlocking said two half link members to each other further comprises:
   a stud member inserted between said two half link members, said stud member having a first end face, a second end face and two curved saddle faces, said first end face having first end face means cooperating with said first machined inwardly directed face means of said short leg of one of said two half link members and said second machined inwardly directed face means of said long leg of the other of said two half link members, said second end face having second end face means cooperating with said first machined inwardly directed face means of said short leg of the other of said two half link members and said second machined inwardly directed face means of said long leg of said one of said two half link members such that said first and second end faces of said stud member form said interlocking means with said two half link members;
   a first aperture in said long leg of each one of said two half link members;

a second aperture in said stud member, said first aperture in each of said long legs of said two half link members and said second aperture in said stud member being aligned to define a bore through said chain coupling link; and a locking rod mounted in said bore of said coupling link whereby said locking rod keeps said stud member and said two half link members in an assembled position.

3. The forged chain link coupling as claimed in claim 1 wherein said first machined inwardly directed face means comprises:

a first machined inwardly directed face on said short leg, said first machined inwardly directed face being in a plane spaced a fifth predetermined distance from said longitudinal median plane; and a second machined inwardly directed face on said short leg adjacent said first machined inwardly directed face, said second machined inwardly directed face being in a plane spaced a sixth predetermined distance from said longitudinal median plane; and wherein said second machined inwardly directed face means further comprises:

a first machined inwardly directed face on said long leg, said first machined inwardly directed face being in a plane spaced a fifth predetermined distance from said longitudinal median plane; and a second machined inwardly directed face on said long leg, said second machined inwardly directed face being in a plane spaced a sixth predetermined distance from said longitudinal median plane, said first and second machined inwardly directed faces of said long and short legs cooperating with said means for interlocking said two half link members to maintain said two half link members in position and to permit easy removal of said means for interlocking said two half link members.

4. The forged chain link coupling as claimed in claim 2 wherein said first machined inwardly directed face means comprises:

a first machined inwardly directed face on said short leg, said first machined inwardly directed face being in a plane spaced a fifth predetermined distance from said longitudinal median plane; and a second machined inwardly directed face on said short leg adjacent said first machined inwardly directed face, said second machined inwardly directed face being in a plane spaced a sixth predetermined distance from said longitudinal median plane; and wherein said second machined inwardly directed face means further comprises:

a first machined inwardly directed face on said long leg, said first machined inwardly directed face being in a plane spaced a fifth predetermined distance from said longitudinal median plane; and a second machined inwardly directed face on said long leg, said second machined inwardly directed face being in a plane spaced a sixth predetermined distance from said longitudinal median plane, said first and second machined inwardly directed faces of said long and short legs cooperating with said means for interlocking said two half link members to maintain said two half link members in position and to permit easy removal of said means for interlocking from said two half link members.

* * * * *

UNITED STATES PATENT AND TRADEMARK OFFICE
CERTIFICATE OF CORRECTION

PATENT NO. : 4,590,758

DATED : May 27, 1986

INVENTOR(S) : Robert Hanning et al

It is certified that error appears in the above-identified patent and that said Letters Patent is hereby corrected as shown below:

Column 7, line 25 delete a comma "," and insert a period ----.----.

Signed and Sealed this

Thirtieth Day of September 1986

[SEAL]

Attest:

DONALD J. QUIGG

Attesting Officer

Commissioner of Patents and Trademarks